US007510587B2

(12) United States Patent
Lee et al.

(10) Patent No.: US 7,510,587 B2
(45) Date of Patent: Mar. 31, 2009

(54) VACUUM CLEANER

(75) Inventors: Jae Hong Lee, Incheon (KR); Hyuk Joo Kwon, Gangneung-si (KR); Seog Yong Kim, Changwon-si (KR); Sang Jun Park, Gimhae-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/929,271

(22) Filed: Oct. 30, 2007

(65) Prior Publication Data

US 2008/0052868 A1 Mar. 6, 2008

Related U.S. Application Data

(63) Continuation of application No. 11/297,435, filed on Dec. 9, 2005.

(30) Foreign Application Priority Data

Dec. 14, 2004 (KR) ...................... 10-2004-0105486

(51) Int. Cl.
*B01D 45/18* (2006.01)

(52) U.S. Cl. ......................... 55/428; 55/429; 55/DIG. 3

(58) Field of Classification Search ................... 55/426, 55/428, 429, 430, 459.1, DIG. 3; 15/347, 15/353
See application file for complete search history.

(56) References Cited

U.S. PATENT DOCUMENTS

| | | | | |
|---|---|---|---|---|
| 4,363,156 | A * | 12/1982 | Leinfelt | 15/327.1 |
| 2006/0010641 | A1 | 1/2006 | Nam et al. | |

FOREIGN PATENT DOCUMENTS

| | | | |
|---|---|---|---|
| EP | 1 136 028 | A2 | 9/2001 |
| EP | 1 283 021 | A3 | 2/2003 |
| JP | 59-36520 | A | 2/1984 |
| JP | 05-317215 | | 12/1993 |
| JP | 7-313412 | A | 12/1995 |
| JP | 2002-051950 | | 2/2002 |
| JP | 2004-89264 | A | 3/2004 |
| KR | 10-1995-16642 | | 7/1995 |
| KR | 10-1996-0001804 | B1 | 2/1996 |

* cited by examiner

*Primary Examiner*—Robert A Hopkins
(74) *Attorney, Agent, or Firm*—Birch, Stewart, Kolasch & Birch, LLP

(57) ABSTRACT

There is provided a vacuum cleaner. The vacuum cleaner includes a dust storing part; a compression passage connecting a motor generating a negative pressure to the dust storing part; a flow passage control unit that controls opening and closing of the compression passage; and a compression unit compressing dust stored in the dust storing part when the compression passage is opened.

13 Claims, 7 Drawing Sheets

VACUUM CLEANER

This application is a Continuation of co-pending application Ser. No. 11/297,435 filed on Dec. 9, 2005, the entire contents of which are hereby incorporated by reference and for which priority is claimed under 35 U.S.C. § 120.

BACKGROUND

1. Field

This document relates to a vacuum cleaner.

2. Description of the Related Art

A typical vacuum cleaner includes a suction nozzle unit to suck air containing foreign substances such as dust and dirt while the suction nozzle unit moves along a floor, a main body in which a suction power generating unit is installed to generate air suctioning force through the suction nozzle unit, a dust collecting unit detachably installed to the main body to filter out the foreign substances, and an operating unit mounted on the main body so that a user grasps the operating unit in use.

The dust collecting unit separates foreign substances from the air sucked through the suction nozzle unit. In one type of the dust collecting unit, foreign substances are collected while air containing the foreign substances passes through a porous filter. In another type of the dust collecting unit, the foreign substances are collected from the air by the cyclone effect. The present invention relates to the cyclone type dust collecting unit much more.

In the cyclone type dust collecting unit, foreign substances contained in the air fall down by the cyclone effect while air is swirled, and the fallen foreign substances are gradually accumulated. When the foreign substances are accumulated to a certain degree, it is removed from the duct collecting unit. Since the cyclone type dust collecting unit utilizes the gravity to drop the foreign substances, the density of the accumulated foreign substances is low.

This low density of the accumulated foreign substances causes the following problems.

Since the limited space of a dust collection container of the dust collecting unit is easily filled up by the loosely accumulated foreign substances, the dust collection container should be emptied frequently, thereby causing inconvenience to users. If the dust collection container is not emptied periodically, the build up of the foreign substances disturbs the airflow and thereby lowers the collecting efficiency of the dust collecting unit.

Further, dust generates from the loosely accumulated foreign substances during the cleaning of the dust collection container. This causes health-related problems and makes the cleaning of the dust collection container more difficult.

Furthermore, when the collected foreign substances are spread throughout the dust collection container, the outer appearance becomes bad to give an unpleasant feeling to the user.

SUMMARY

Accordingly, the embodiments are directed to a vacuum cleaner, which substantially obviates one or more problems due to limitations and disadvantages of the related art.

An object of the embodiments is to provide a vacuum cleaner, which is designed to increase the density of collected foreign substances.

Another object of embodiments is to provide a vacuum cleaner, which is designed to compress collected foreign substances at a preset position in the dust collecting unit to clearly remove the collected foreign substances, prevent generation of dust when the collected foreign substances are removed, and prevent the collected foreign substance from spreading in the dust collecting unit.

A further another object of embodiments is to provide a vacuum cleaner, which is designed to compress collected foreign substances through a simple manipulation so that the vacuum cleaner can be used more conveniently.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the embodiments, as embodied and broadly described herein, there is provided a vacuum cleaner, the vacuum cleaner including: a dust storing part; a compression passage connecting a motor generating a negative pressure to the dust storing part; a flow passage control unit that controls opening and closing of the compression passage; and a compression unit compressing dusts stored in the dust storing part when the compression passage is opened.

In another aspect of the embodiments, there is provided a vacuum cleaner, the vacuum cleaner including: a main passage; a motor connection passage communicating the main passage with a motor generating a negative pressure; a dust collection passage communicating the main passage with a dust separation part separating dust contained in air; a compression passage communicating the main passage with a dust storing part storing the dust separated by the dust separation part; and a flow passage control unit provided in the main passage, for selectively communicating the main passage with the compression passage or the dust collection passage.

According to the present invention, the inner space of the dust collecting unit can be efficiently used by compressing the collected foreign substances. Therefore users can conveniently use the vacuum cleaner. Particularly, dust does not generate when the collected foreign substances are removed from the dust collecting unit, and the removing of the collected foreign substances from the dust collecting unit can be done less frequently but more easily.

Further, the compressing operation of the collected foreign substances can be performed by a simple manipulation, thereby providing convenience to users.

DETAILED DESCRIPTION

Reference will now be made in detail to the preferred embodiments of the present invention, examples of which are illustrated in the accompanying drawings.

Figure 1:
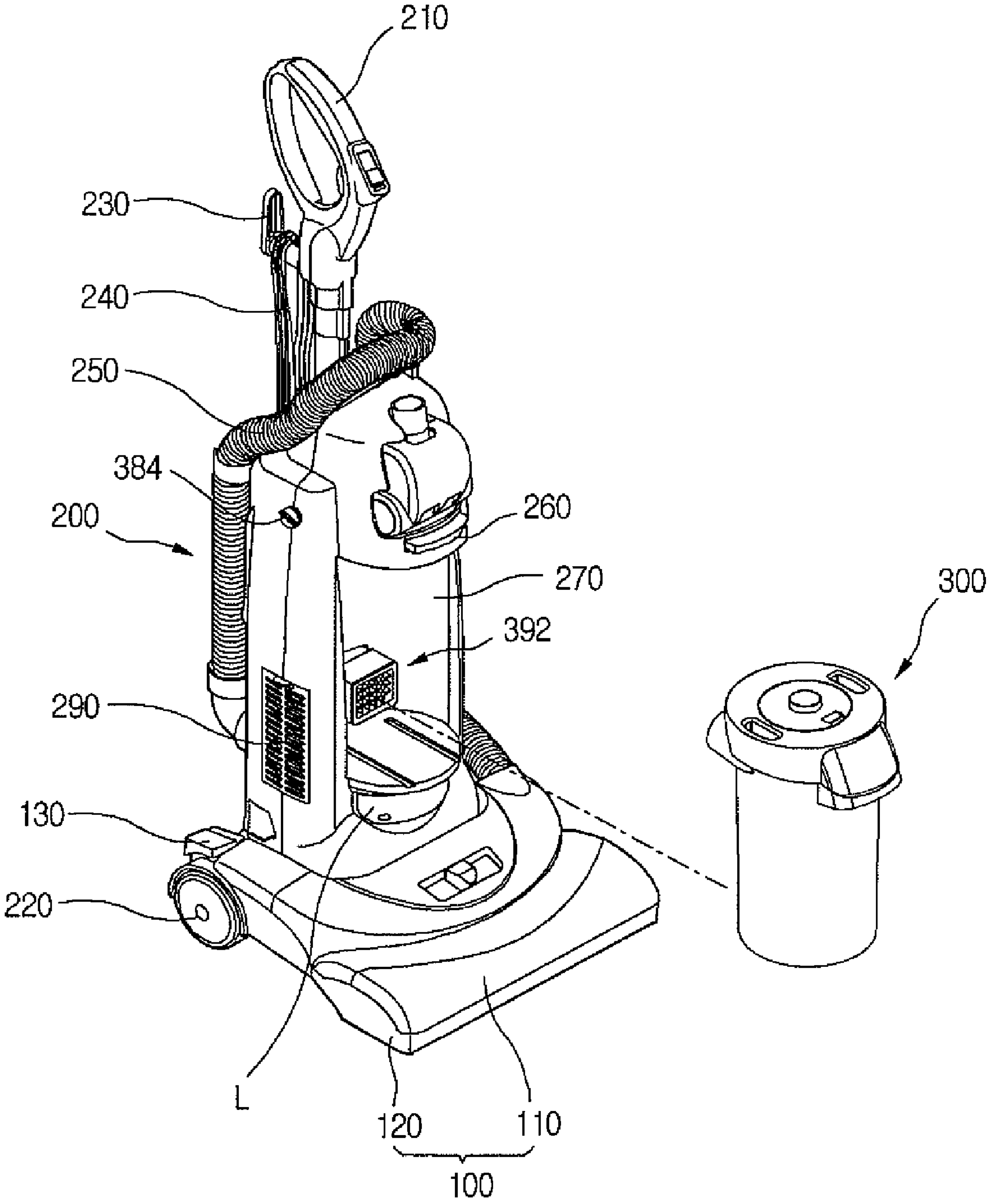
FIG. 1 is a perspective view of an upright vacuum cleaner according to the present embodiment.

FIG. 1 is a perspective view of an upright vacuum cleaner according to the present embodiment.

Referring to FIG. 1, the upright type vacuum cleaner includes a suction nozzle unit 100 sucking air containing foreign substances such as dust and dirt, a main body 200 in which suction power generating unit is installed to suck the air, and an operating unit 210 mounted on a top of the main body 200 so that a user grasps the operating unit 210 in use.

Hereinafter, the structure of the vacuum cleaner will be more fully described.

The suction nozzle unit 100, which is designed to suck the air, includes a nozzle upper cover 110 and a nozzle lower cover 120 that form the upper and lower outsides of the suction nozzle unit 100, respectively. The lower nozzle cover 120 defines an air intake (not shown) in a bottom surface as a main suction passage for sucking the air. Further the suction nozzle unit 100 includes wheels 220 on both sides for an easy movement of the vacuum cleaner.

The main body 200 is designed to pivot rearward within a predetermined angle range with respect to the suction nozzle unit 100. To control the pivotal motion of the main body 200, a pivot lever 130 is provided on a top-rear end of the suction nozzle unit 100. Therefore, when the user steps on the pivot lever 130 and pulls the main body 200 rearward using the operating unit 210, the main body 200 is inclined rearward. Therefore, the user can adjust an angle of the main body 200 in response to his/her height.

A wire fixing member 230 is formed on a rear portion of the main body 200. Preferably, a pair of wire fixing members 230 may be formed on the rear portion of the main body 200 at up and down positions in a symmetric manner. An electric wire 240 for supplying electric power is kept around the pair of wire fixing members 230.

A motor (not shown) for generating suctioning force is installed in the main body 200 to suck the outside air and foreign substances through the suction nozzle unit 100. A flexible suction hose 250 is provided on a center portion of the main body 200 to guide the foreign substances contained in the air sucked through the suction nozzle unit 100 to a dust collecting unit 300.

The main body 200 is provided with a coupling knob 260 on a front surface for separation of the dust collecting unit 300 (described in detail later) from the main body 200. The coupling knob 260 makes interference with a portion of the dust collecting unit 300 to confine the dust collecting unit 300. Thus, the dust collecting unit 300 is not separated from the main body 200 when the coupling knob 260 is not handled.

Under the coupling knob 260, a mounting portion 270 recessed into the main body 200 is provided. The mounting portion 270 detachably receives the dust collecting unit 300. On a top surface of the mounting portion 270, a dust collection passage 376 is provided to discharge air passed through the dust collecting unit 300 in an upward direction. For this, the dust collection passage 376 makes connection with an exhaust rib (refer 322 in FIG. 2, described later) of the dust collecting unit 300 when the dust collecting unit 300 is inserted in the mounting portion 270.

A lamp (L) is installed under the mounting portion 270, such that the cleaning of dark places such as a corner and a place under a table can be easily carried out by turning on the lamp (L). A discharge portion 290 is provided on a left side to the lamp (L) to discharge the air passed through the dust collecting unit 300 to the outside of the main body 200. An exhaust filter (not shown) is provided in the discharge portion 290. The exhaust filter further filters out foreign substances from the air that is being exhausted to the outside through the discharge portion 290, thereby discharging more clean air to the room.

Figure 2:
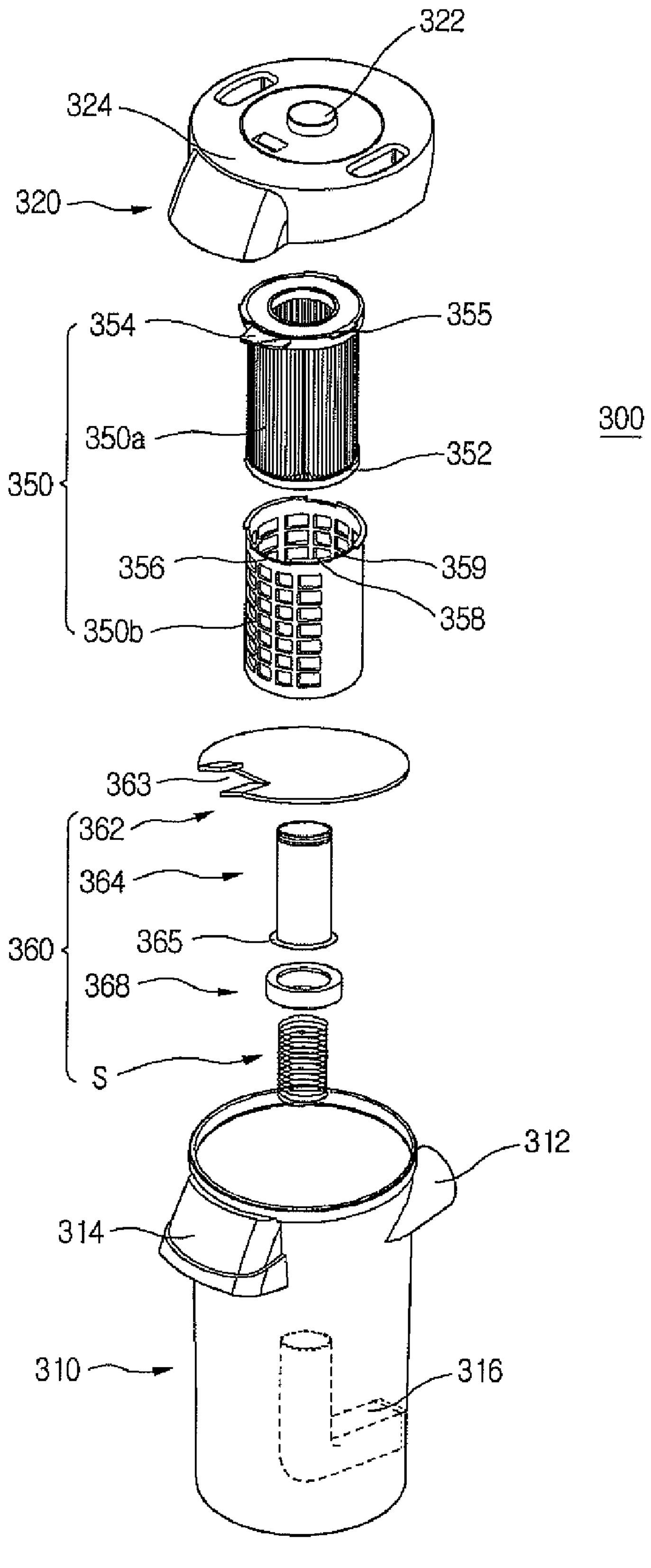
FIG. 2 is an exploded perspective view of a dust collecting unit of a vacuum cleaner according to the present embodiment.

FIG. 2 is an exploded perspective view of a dust collecting unit of a vacuum cleaner according to an embodiment of the present embodiment.

Referring to FIG. 2, the dust collecting unit 300, which is to be detachably mounted in the mounting portion 270, filters foreign substances from air introduced through the suction nozzle unit 100. The dust collecting unit 300 may employ a cyclone type collection unit, a filter type collection unit, or a combination of the cyclone and filter type collection units.

The overall structure of the dust collecting unit will be more fully described.

The dust collecting unit 300 has a hollow cylindrical shape. The dust collecting unit 300 includes a dust collection container 310 in which foreign substances are collected and a top cover 320 detachably provided on a top of the dust collection container 310 to cover the top.

The top cover 320 includes the exhaust rib 322 protruded from a top center to a predetermined height and a hole defined in the exhaust rib 322. The exhaust rib 322 guides the air passed through the dust collecting unit 300 in an upward discharging direction. The top cover 320 further includes a coupling groove 324 in front of the exhaust rib 322. The coupling groove 324 is hooked by the coupling knob 260 such that the dust collecting unit 300 can be confined in the main body 200 without departing from the main body 200.

The dust collection container 310 is formed with a suction guide 312 on an outer surface. One end of the suction guide 312 is projected from the outer surface to a predetermined length to guide air into the dust collection container 310. The suction guide 312 is designed such that the air can be swirled in the dust collection container 310 in a tangential direction along the inner wall of the dust collection container 310. For this purpose, the suction guide 312 is projected from the outer surface of the dust collection container 310 at an inclined angle.

The dust collection container 310 further includes a handle 314 on the outer surface opposing to the suction guide 312. The handle 314 defines a recess in a bottom so that a user can easily grasp the handle 314 when the user detaches the dust collecting unit 300 from the main body 200.

In a lower portion of the dust collection container 310, a discharging pipe 316 is provided to communicate the inside of the dust collection container 310 to the outside. The discharging pipe 316 has a bent shape with a predetermined height, and it receives a spring (S). A compression unit 360 is guided by a vertical portion of the discharging pipe 316 when the compression unit 360 is installed in the dust collection container 310.

Under the top cover 320, a filter assembly 350 is provided to filter out relatively small foreign substances from the air introduced into the dust collecting unit 300. The filter assembly 350 is detachably installed on a bottom of the top cover 320. The filter assembly 350 includes an inner filter 350*a* and an outer filter 350*b*. Preferably, the filter assembly 350 has strength enough to resist a strong air flow, and it is made of material that is not affected by washing. For example, polyester fabric or permeable plastic may be used for the filter assembly 350. The inner filter 350*a* has a hollow cylindrical shape. The inner filer 350 filters out fine foreign substances from the air introduced into the dust collection container 310. The inner filter 350*a* includes an elastic seal portion 352 on a lower end. The seal portion 352 is tight fitted into a lower end of the outer filter 350*b* to prevent air leakage.

On an upper end of the inner filter 350*a*, a stopping protrusion 354 and fixing protrusions 355 are formed. The stopping protrusion 354 restricts rotation of the inner filter 350*a* when the inner filter 350 is mounted on the bottom of the top cover 320. The fixing protrusions 355 fix the inner filter 350*a* in the outer filter 350*b*.

The outer filter 350*b* has a cylindrical shape with an inner diameter slightly larger than the outer diameter of the inner filter 350*a*. At a top end of the outer filter 350*b*, coupling ribs 358, a receiving groove 356, and fixing grooves 359 are formed. The coupling ribs 358 are protruded from the top end of the outer filter 350*b* in a radial direction for coupling with the top cover 320, the receiving groove 356 receives the stopping protrusion 354, and the fixing grooves 359 receives the fixing protrusions 355 to restrict rotation of the inner filter 350*a*.

Under the filter assembly 350, the compression unit 360 is installed. The compression unit 360 includes a compartment plate 362 dividing the inner space of the dust collecting unit 300 into up and down compartments, a cylindrical slider 364 joined to a bottom of the compartment plate 362, a guide 368 guiding the slider 364 in up and down directions and confining a lower end of the slider 364, and the spring (S) disposed in the guide 368 to apply elastic force.

The compartment plate 362 is placed in the dust collecting unit 300 at a middle position. The compartment plate 362 prevents relatively heavy foreign substances fallen under the compartment plate 362 from reversely moving in an upward direction, and the compartment plate 362 compresses collected foreign substances. The compartment plate 362 may define a falling hole 363 in a circumference to allow the heavy foreign substances to fall therethrough.

The upper compartment of the dust collecting unit 300 is used as a foreign substance separating compartment for separating the foreign substances from the air by the cyclone effect, and the lower compartment of the dust collecting unit 300 is used as a foreign substance storing compartment for storing the foreign substances separated from the air.

The upper end of the slider 364 is fixed to the bottom surface of the compartment plate 362. The slider 364 has an elongated cylindrical shape for movement in up and down directions when the compartment plate 362 compresses the foreign substances stored in the lower compartment. The slider 364 includes a stopping flange 365 protruded from a lower end in a radial direction to a predetermined length. In detail, the stopping flange 365 formed on the lower end of the slider 364 makes interference with the guide 368 such that separation of the slider 364 from the guide 368 can be prevented.

The guide 368 is provided around the bottom of the slider 368 to guide the up and down movement of the slider 364. The guide 368 has a body portion with an inner diameter corresponding to the outer diameter of the stopping flange 365 and a top end portion with an inner diameter slightly smaller than the outer diameter of the stopping flange 365. Therefore, when the slider 364 is fully moved in an upward direction, the stopping flange 365 is abutted against the top end portion of the guide 368, such that the slider 364 can be prevented from separating from the guide 368. Alternatively, the guide 368 may have a uniform inner diameter to guide the slider 364 more stably. In this case, the stopping flange 365 of the slider 364 is stopped by a lower end of the guide 368. Meanwhile, the guide 368 is fixed to an upper end of the discharging pipe 316.

Under the guide 368, the spring (S) having a predetermined elasticity is positioned to elastically support the slider 364. Therefore, the compartment plate 362 can be placed in the dust collecting unit 300 at a middle position, and the compartment plate 362 can be returned to its original position after it is moved down to compress the foreign substances storing in the lower compartment.

The compartment plate 362, the slider 364, the guide 368, and the spring (S) are disposed in the dust collection container 310 to compress the collected foreign substances. In detail, the compartment plate 362 is moved downward by external force to compress the foreign substances collected in the dust collection container 310, and the compartment plate 362 is moved up to its original position by the restoring force of the spring (S) when the external force is removed. Meanwhile, the up and down movement of the compartment plate 362 is guided by the slider 364 and the guide 368 to an exact position in an exact direction.

The external force causing the compartment plate 362 to move downward is originated from the pressure change of air in the dust collecting container 310. Hereinafter, the structure and mechanism for generating the air pressure change will be described.

Figure 3:
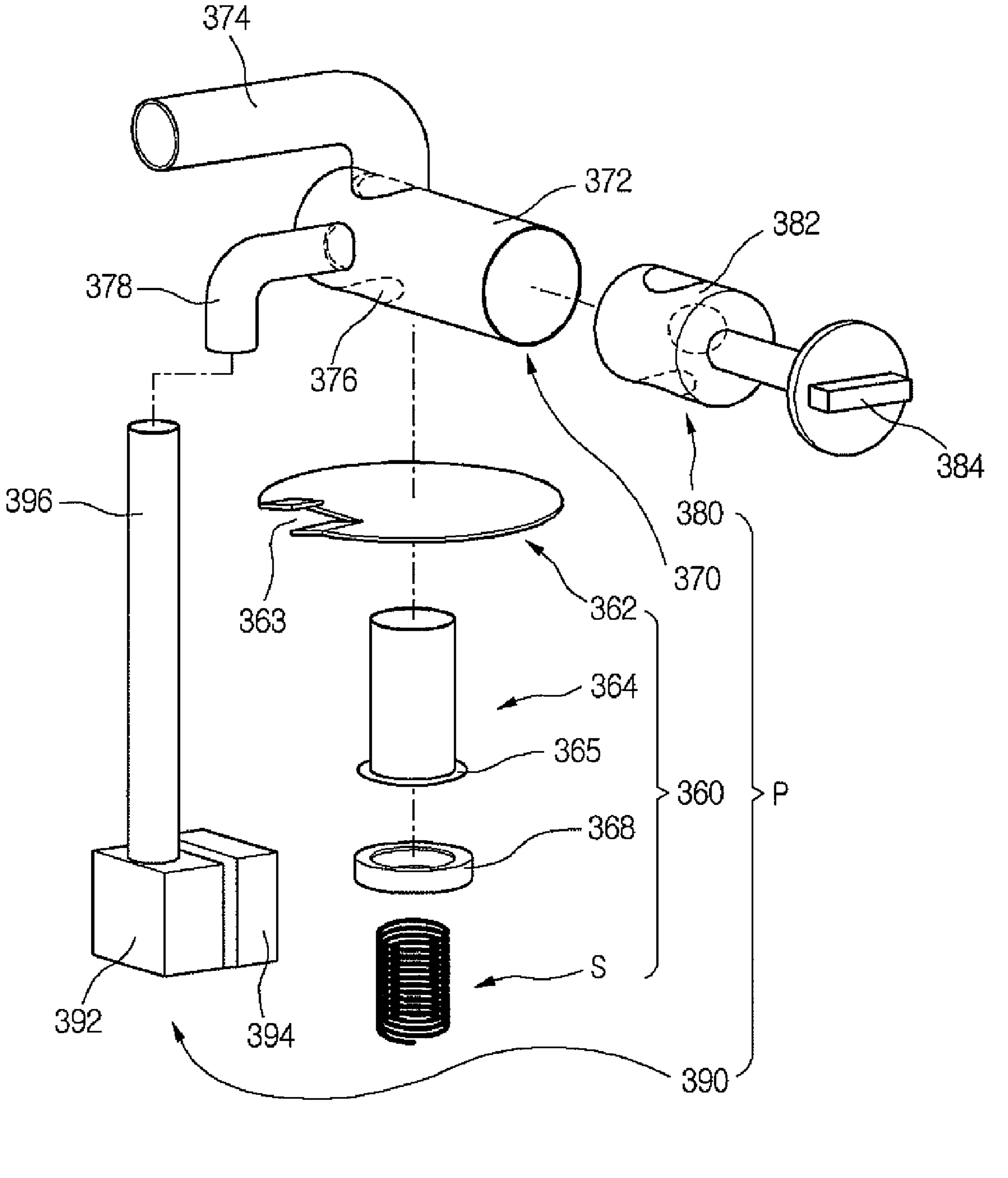
FIG. 3 is an exploded perspective view of a dust compressing apparatus of a vacuum cleaner according to the present embodiment.
Figure 4:
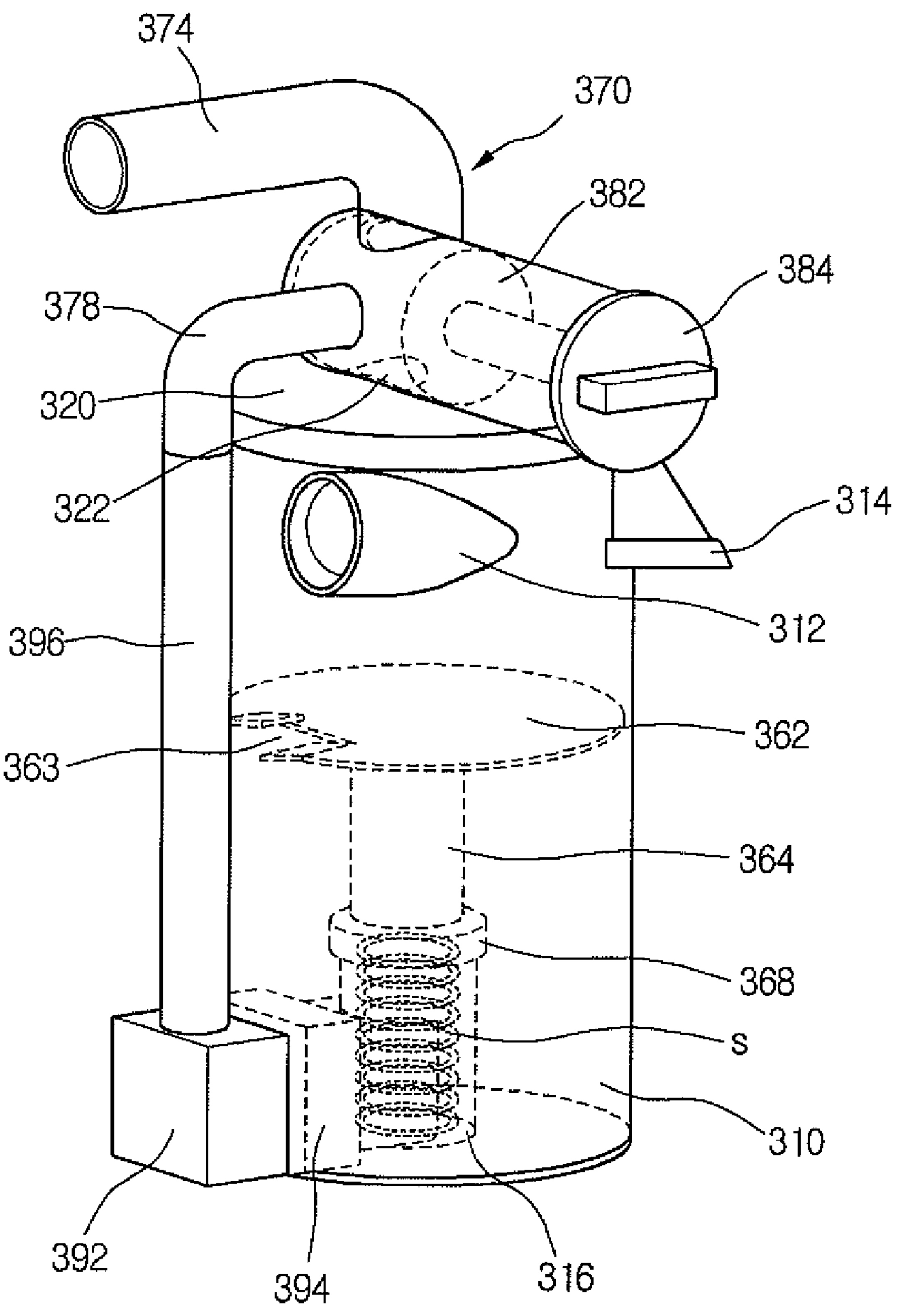
FIG. 4 shows an operation of a dust compressing apparatus of a vacuum cleaner according to the present embodiment.

FIG. 3 is an exploded perspective view of a dust compressing apparatus of a vacuum cleaner according to the present embodiment, and FIG. 4 is a phantom view showing the relationship between a dust compressing apparatus and a dust collecting unit of a vacuum cleaner according to the present embodiment. FIGS. 3 and 4 schematically show the dust collecting unit and corresponding parts such as flow passages and a control unit to describe the relationship therebetween. Thus, the illustrated components of the vacuum cleaner can be different from the real components.

Referring to FIGS. 3 and 4, the dust compressing apparatus (P) includes a branching unit 370 formed with a plurality of branch passages, a flow passage control unit 380 rotatably installed in the branching unit 370 to switch the branch passages between on and off, a compression inducing unit 390 connected between the branching unit 370 and the discharging pipe 316 to allow airflow when the foreign substances are compressed, and the compression unit 360.

The elements of the dust compressing apparatus will now be more fully described.

The branching unit 370 is connected with a motor (not shown) generating suction force to guide airflow therethrough. The branching unit 370 includes a main passage 372 at a right lower portion. The main passage 372 has a hollow cylindrical shape with a closed one end to accommodate the flow passage control unit 380 that controls the direction of airflow. The main passage 372 is mounted on an upper portion of the mounting portion 270 of the main body 200. A "┓"-shaped motor connection passage 374 is connected to a top surface of the main passage 372 for communication between the motor and the main passage 372. Through the motor connection passage 374, the suction force generated from the motor is transmitted to the dust collecting unit 300 to filter out the foreign substances.

The dust collection passage 376 is formed in a bottom surface of the main passage 372. The dust collection passage 376 has a size corresponding to the size of the exhaust rib 322 of the top cover 320. The dust collection passage 376 make contact with the exhaust rib 322 in communication with the hole defined in the exhaust rib 322 when the dust collecting unit 300 is installed in the mounting portion 270 of the main body 200. Therefore, after the foreign substances are filtered from the air in the dust collecting unit 300, the air can be discharged in an upward direction.

A hollow and "┌"-shaped compression passage 378 is provided on a right side (when seen in FIG. 5) of the main passage 372. The compression passage 378 is connected to a top end of the compression inducing unit 390 to transmit the suction force from the motor to the lower compartment of the dust collecting unit 300 when the dust compressing apparatus (P) operates.

The flow passage control unit 380 includes a switch rod 382 and a switch rod handle 384. The switch rod 382 is rotatably inserted into the main passage 372. By rotating the switch rod 382 in the main passage 372, the compression passage 378 and the dust collection passage 376 can be selectively opened and closed. The switch rod handle 384 is extended from an end of the switch rod 382 and exposed to the outside of the main body 200 so that a user can rotate the switch rod 382 using the switch rod handle 384.

To reduce the loss of the motor suction power, it is preferable that when the switch rod 382 is inserted in the main passage 372, the outer surface of the switch rod 382 makes contact with the inner surface of the main passage 372 for sealing therebetween. For example, the switch rod 382 can be tight fitted into the main passage 372, or an elastic rubber seal can be provided around the switch rod 382. The switch rod 382 define a "T"-shaped passage such that the compression passage 378 and the dust collection passage 376 can be selectively closed and opened when the switch rod 382 is rotated in tight contact with main passage 372.

The compression inducing unit 390 has a box shape in the rough. The compression inducing unit 390 includes a horizontal pipe 392 and a circular vertical pipe 396 extended from a top of the horizontal pipe 392 in an upward direction for connection with the compression passage 378.

The horizontal pipe 392 has an opened right side for communication with the discharging pipe 316 that is installed in the lower compartment of the dust collection container 310. When the dust collecting unit 300 is installed in the mounting portion 270, the opened right side of the horizontal pipe 392 overlaps with the discharging pipe 316. Preferably, the opened right side is inserted into the discharging pipe 316. Further, a rubber press member 394 may be provided around the opened right side of the horizontal pipe 392 to prevent air leakage.

Figure 5:
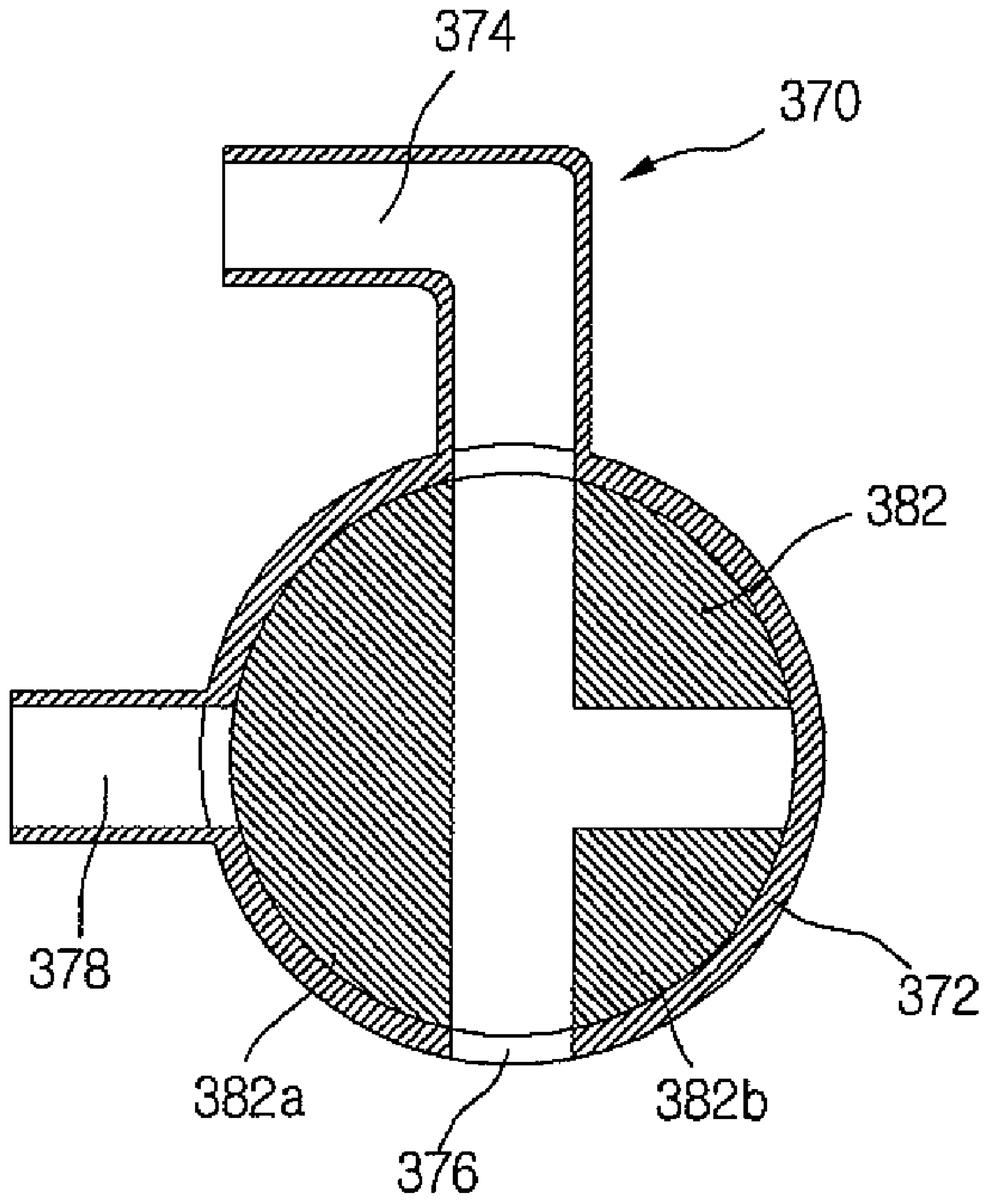
FIGS. 5 and 6 are cross sectional views showing the positional relationship between a branching unit and a flow passage control unit of a dust compressing apparatus of a dust collecting unit of a vacuum cleaner when a cleaning operation and a dust compressing operation are performed according to the present embodiment.
Figure 6:
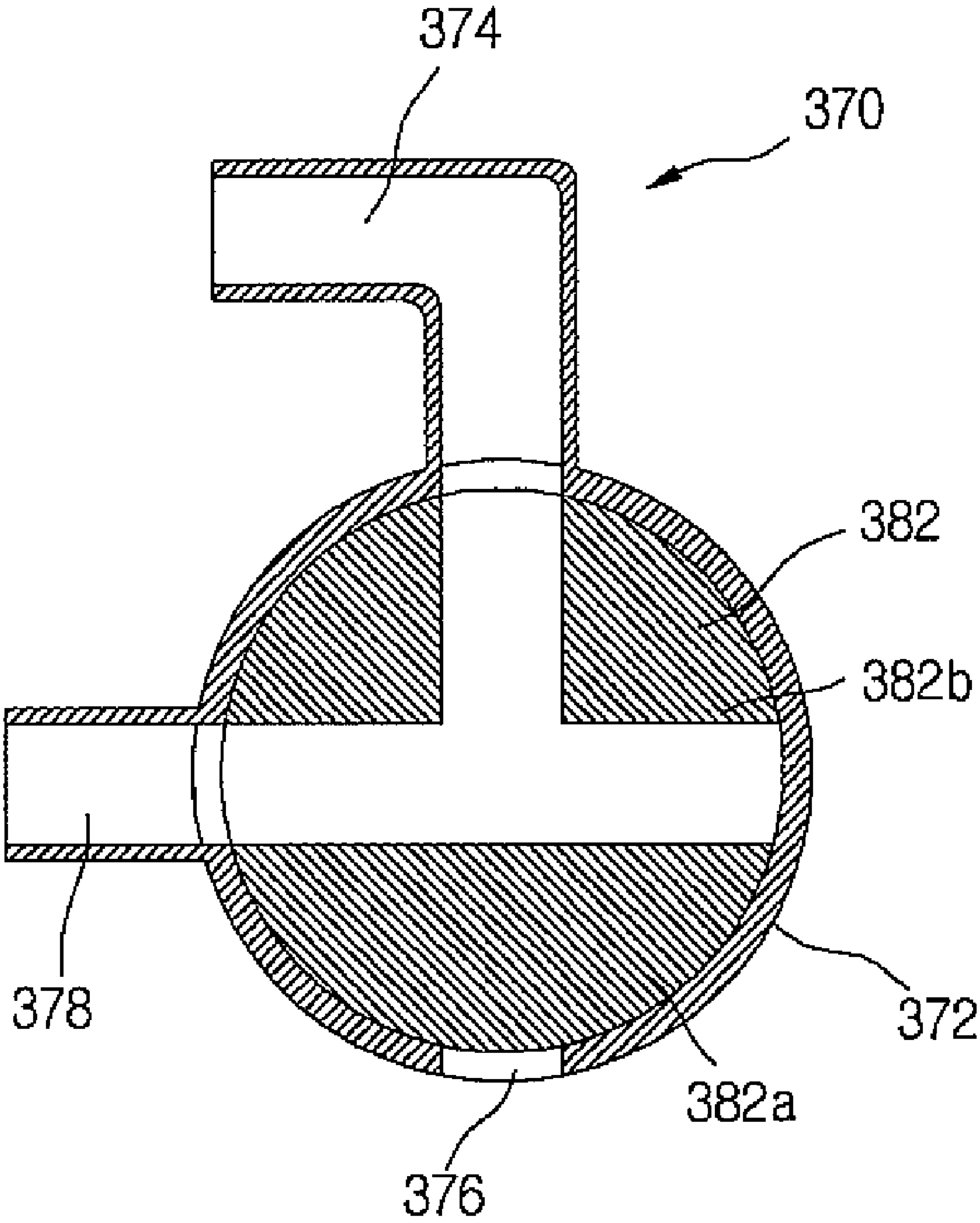

Hereinafter, the operations of the dust collecting unit and the dust compressing apparatus will be described. FIGS. 5 and 6 are cross sectional views showing the positional relationship between a branching unit and a flow passage control unit of a dust compressing apparatus of a dust collecting unit of a vacuum cleaner when a cleaning operation and a dust compressing operation are performed according to the present embodiment.

First, the operation of the vacuum cleaner in cleaning mode will be described with reference to FIGS. 4 through 6. When the vacuum cleaner is turned on, the motor installed in the main body 200 is rotated to generate suction force. By the suction force, air containing foreign substances such as dust and dirt are sucked through the suction nozzle unit 100, and the sucked air is directed into the dust collection container 310 through the suction guide 312.

Here, the "T"-shaped passage of the switch rod 382 is positioned as shown in FIG. 5 such that the motor connection passage 374 is connected with the dust collection passage 376 and the compression passage 378 is closed.

The air introduced into the dust collecting container 310 through the suction guide 312 is swirled along the inner wall of the dust collection container 310. While the air is swirled, relatively heavy foreign substances falls down through the falling hole 363 and accumulates under the compartment plate 362, and relatively light foreign substances are swirled around the filter assembly 350 and filtered by the filter assembly 350.

The air passed through the filter assembly 350 is discharged to the outside of the dust collecting unit 300 through the exhaust rib 322, the dust collection passage 376, and the motor connection passage 374. Then, the air through the motor (not shown) and discharged to the outside of the vacuum cleaner through the discharge portion 290 mounted on the outer surface of the main body 200.

Meanwhile, when the foreign substances are collected in the dust collecting container 310 to a predetermined degree after the cleaning operation, the dust compressing apparatus (P) is operated to compress the collected foreign substances. The compressing operation of the dust compressing apparatus (P) will now be described in detail.

To operate the dust compressing apparatus (P), the switch rod handle 384 protruded from the outer surface of the main body 200 is rotated 90 degrees in a counterclockwise. By the rotation of the switch rod handle 384, the switch rod 382 is rotated to a position shown in FIG. 6, such that the dust collection passage 376 is closed and the compression passage 378 is connected to the motor connection passage 374.

When the airflow passage is changed by the rotation of the switch rod handle 384, the compartment plate 362 disposed in the dust collecting unit 300 compresses the collected foreign substances. In detail, the suction force generated from the motor is sequentially transmitted to the lower compartment of dust collection container 310 through the motor connection passage 374, the switch rod 382, the compression passage 378, the compression inducing unit 390, and the discharging pipe 316. Therefore, the pressure of the lower compartment of the dust collection container 310 becomes lower than that of the upper compartment of the dust collection container 310. This pressure difference causes pull-down force(=area of the compartment plate 362×pressure difference) that pulls down the compartment plate 362. Upon the down movement of the compartment plate 362, the foreign substances collected in the lower compartment are compressed.

In detail, when the compartment plate 362 is pulled down, the slider 364 is also moved downward. As the slider 364 is moved down, the spring (S) is compressed by the stopping flange 365 formed on the lower end of the slider 364. To push the spring (S), the stopping flange 365 may have a closed lower surface. Although FIG. 4 shows that the slider 364 and the spring (S) slide in the discharging pipe 316, the present embodiment is not limited to the illustrated structure. That is, the slider 364 and the spring (S) can be disposed outside the discharging pipe 316. Merely, since the foreign substances can be accumulated on the slider 364 and the spring (S), it may be more preferable that the slider 364 and the spring (S) are disposed in the discharging pipe 316.

Meanwhile, it is preferable that the down movement of the compartment plate 362 is carried out discontinuously in several steps for a short time rather than being carried out continuously in one step. Therefore, overheating of the motor can be prevented, and the foreign substances caked on the inner wall of the dust collecting container can be more clearly compressed. Further, while the compartment plate 362 is moved down, a certain amount of air flows from the upper compartment to the lower compartment through the falling hole 363 to prevent the overheating of the motor. The size of the falling hole 363 may be determined depending on the cleaning and compressing conditions of the vacuum cleaner.

After the compression of the collected foreign substances is completed through the above-mentioned process, the switch rod handle 384 is rotated 90 degrees in a clockwise direction to position the switch rod 382 as shown in FIG. 5. Then, the pull-down force acting on the compartment plate 362 is removed, and thus the compartment plate 362 is moved up to its original position by the restoring force of the spring (S) acting on the flange 365.

Figure 7:
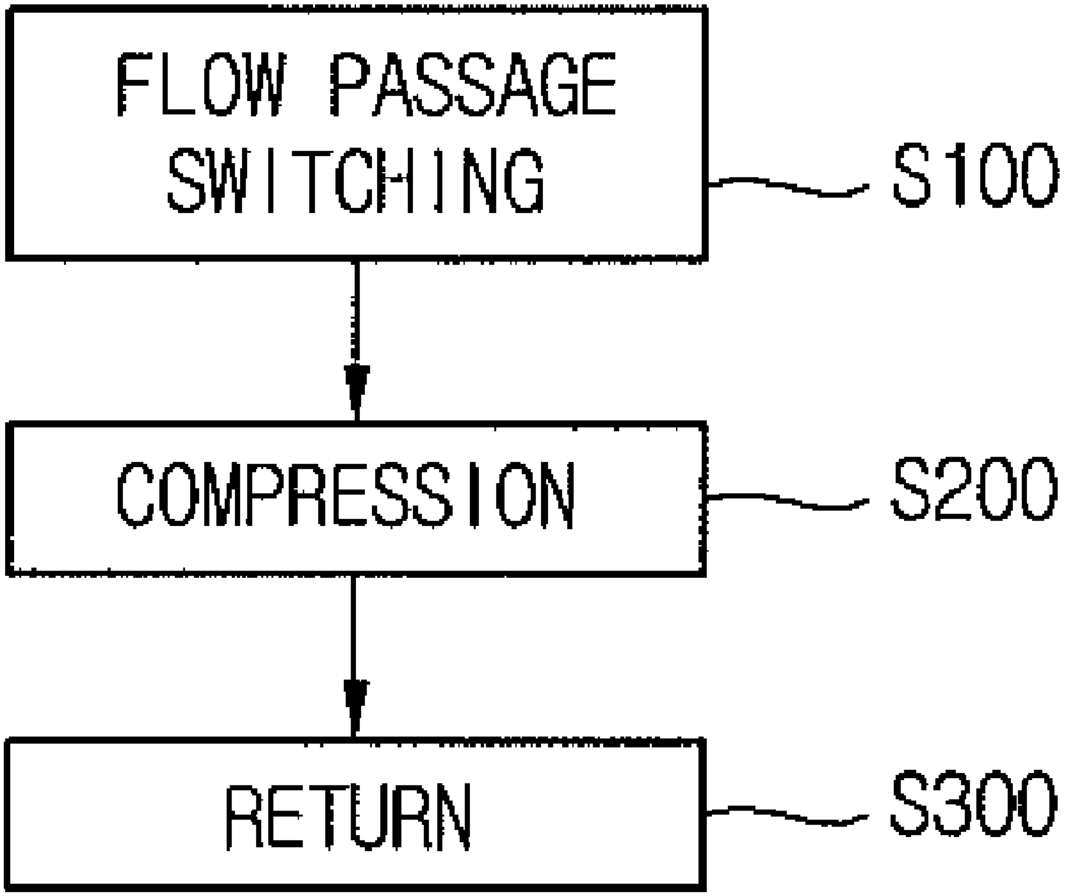
FIG. 7 is a flowchart showing a dust compressing method for a vacuum cleaner according to the present embodiment.

The foreign substance compressing operation will now be more fully described with reference to FIG. 7. FIG. 7 is a flowchart showing a dust compressing method for a vacuum cleaner according to the present embodiment.

Referring to FIG. 7, in operation S100, the flow passage control unit 380 is controlled to change the flow passage through which the suction force generated by the motor (not shown) and the fan (not shown) are applied. That is, the passage where negative pressure is to be applied is determined.

In operation S200, since negative pressure is applied to the lower compartment under compartment plate 362 when the flow passage is changed in operation S100, the compartment plate 362 is pulled down to compress foreign substances collected in the lower compartment.

In operation s300, after the foreign substances are compressed to a certain degree, the flow passage control unit 380 is controlled to direct the suction force by the motor and the fan toward the upper compartment above the compartment plate 362, and the compartment plate 362 is returned to its original position by the restoring force of the spring (S).

The compression of the foreign substances can be performed in a first compressing mode or in a second compressing mode. In the first compressing mode, the compressing operation S200 is started and carried out while the motor and the fan are continuously operated. In the second compressing mode, after the flow passage changing operation S100 is carried out, the motor is powered on to carry out the compressing operation S200, and then the motor is powered off to carry out the returning operation S300. Since the overheating of the motor can be prevented in the second compressing mode, the second compressing mode is more preferable.

As described above, according to the dust compressing method and apparatus of the present embodiment, suction power of the motor can be used to compress the foreign substances collected in the dust collecting unit by changing the flow passage with the switch rod handle.

Therefore, the limited inner space of the dust collection container can be efficiently used, so that the removing of the collected foreign substances from the dust collection container can be carried out less frequently. Therefore, the inconvenience of frequent cleaning of the dust collection container can be eliminated.

Further, since the collected foreign substances are compressed, dust is not generated when the collected foreign substances are removed from the dust collection container, thereby increasing users' convenience.

Furthermore, the compression of the collected foreign substances is performed through a simple manipulation for using the suction power of the motor, so that user's satisfaction can be increased since manual compressing action is not required.

It will be apparent to those skilled in the art that various modifications and variations can be made in the present invention. Thus, it is intended that the present invention covers the modifications and variations of this invention provided they come within the scope of the appended claims and their equivalents.

For example, although the upright type vacuum cleaner is exampled in the embodiments, the present invention is not limited to this case. That is, the present invention can be applied to the canister type vacuum cleaner or other types of vacuum cleaners.

What is claimed is:

1. A vacuum cleaner, comprising;

a dust storing part;

a compression passage communicating a motor generating a negative pressure with an inner space of the dust storing part;

a flow passage control unit that controls opening and closing of the compression passage; and a compression unit provided at an inner side of the dust storing part, compressing dust stored in the dust storing part when the compression passage is opened.

2. The vacuum cleaner according to claim 1, wherein the compression unit includes a compression member movably disposed within the dust storing part.

3. The vacuum cleaner according to claim 2, wherein the compression unit includes an elastic member elastically supporting the compression member.

4. The vacuum cleaner according to claim 2, further comprising a dust separation part separating dust contained in air, wherein the compression member divides the dust separating part and the dust storing part.

5. The vacuum cleaner according to claim 4, wherein the dust compression member has an opening discharging the dust separated by the dust separation part into the dust storing part.

6. The vacuum cleaner according to claim 4, further comprising a discharging pipe for communicating the compression passage with the dust storing part, wherein the compression member is provided at an upper side of the discharging pipe.

7. The vacuum cleaner according to claim 2, wherein the compression unit includes a slider extended downward from the compression member and a guide guiding movement of the slider.

8. The vacuum cleaner according to claim 1, further comprising a discharging pipe for communicating the compression passage with the dust storing part, wherein a portion of the compression unit is capable of sliding in the discharging pipe.

9. A vacuum cleaner, comprising;

a main passage;

a motor connection passage communicating the main passage with a motor generating a negative pressure;

a dust collection passage communicating the main passage with a dust separation part separating dust contained in air;

a compression passage communicating the main passage with a dust storing part storing the dust separated by the dust separation part;

a flow passage control unit provided in the main passage, for selectively communicating the main passage with the compression passage or the dust collection passage; and a compression unit compressing dusts stored in the dust storing part when the main passage is communicated with the compression passage.

10. The vacuum cleaner according to claim 9, wherein the flow passage control unit is movably disposed within the main passage.

11. The vacuum cleaner according to claim 9, wherein the flow passage control unit has a flow passage guiding airflow.

12. The vacuum cleaner according to claim 9, wherein the compression unit compresses the dust stored in the dust storing part when the motor connection passage is communicated with the compression passage.

13. The vacuum cleaner according to claim 9, wherein the flow passage control unit includes:

a switch rod to selectively open and close the compression passage and the dust collection passage; and a driving unit driving the switch rod.

* * * * *